United States Patent
Bonhomme

(10) Patent No.: US 8,276,629 B2
(45) Date of Patent: Oct. 2, 2012

(54) TREAD COMPRISING DUAL ORIENTATION INCISIONS

(75) Inventor: Patrice Bonhomme, Parent (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 390 days.

(21) Appl. No.: 12/517,757

(22) PCT Filed: Dec. 3, 2007

(86) PCT No.: PCT/EP2007/063135
§ 371 (c)(1),
(2), (4) Date: Jun. 4, 2009

(87) PCT Pub. No.: WO2008/068216
PCT Pub. Date: Jun. 12, 2008

(65) Prior Publication Data
US 2010/0078107 A1  Apr. 1, 2010

(30) Foreign Application Priority Data
Dec. 7, 2006 (FR) ..................................... 06 10753

(51) Int. Cl.
*B60C 11/12* (2006.01)
(52) U.S. Cl. ......... 152/209.21; 152/209.23; 152/209.27; 152/DIG. 3; 152/902
(58) Field of Classification Search .............. 152/209.18, 152/209.21, 209.23, 209.27, DIG. 3, 902
See application file for complete search history.

(56) References Cited

U.S. PATENT DOCUMENTS

| | | | |
|---|---|---|---|
| 2002/0033214 A1 | 3/2002 | Carra et al. | |
| 2002/0139164 A1 * | 10/2002 | Ishihara | 152/DIG. 3 |
| 2007/0295434 A1 * | 12/2007 | Nguyen et al. | 152/DIG. 3 |

FOREIGN PATENT DOCUMENTS

| | | |
|---|---|---|
| CH | 331 107 A | 6/1958 |
| DE | 10 2005 030566 A1 | 2/2006 |
| EP | 1195271 A2 * | 4/2002 |

(Continued)

OTHER PUBLICATIONS

Machine translation for Japan 2007-045316 (no date).*

(Continued)

*Primary Examiner* — Steven D Maki
(74) *Attorney, Agent, or Firm* — Cozen O'Connor

(57) ABSTRACT

A tread (1) having a plurality of raised elements (5) provided with at least one first incision (10) and at least one second incision (20). Each first incision (10) comprises at least two non-planar parts (111) separated by an intermediate part (112). The non-planar parts exhibit a dual undulation, whereas the planar parts have a single undulation. Each second incision (20) comprises at least two non-planar parts (211) separated by an intermediate part (212). The non-planar parts (212) exhibit at least one undulation (2112) in the depth of the tread of maximum amplitude C, whereas each intermediate part (212) of the at least one second incision (20) has no deformation in relief. The first incisions (10) intersecting at least one second incision (20) to form at least one intersection and thus divide the raised element (5) in which they are made into several volume elements (55), each intersection being created between an intermediate part (112) of the at least one first incision (10) and an intermediate part (212) of the at least one second incision (20).

7 Claims, 2 Drawing Sheets

FOREIGN PATENT DOCUMENTS

| | | | |
|---|---|---|---|
| EP | 1580034 A | | 9/2005 |
| JP | 03-090317 A | * | 4/1991 |
| JP | 2000 177330 A | | 6/2000 |
| JP | 2002 103921 A | | 4/2002 |
| JP | 2006-051863 A | * | 2/2006 |
| JP | 2006-082659 A | * | 3/2006 |
| JP | 2007-045316 A | * | 2/2007 |
| WO | WO 2005/123420 A1 | | 12/2005 |

OTHER PUBLICATIONS

Machine translation for Japan 2006-082659 (no date).*
Machine translation for Japan 2006-051863 (no date).*
Machine translation for Europe 1,195,271 (no date).*

* cited by examiner

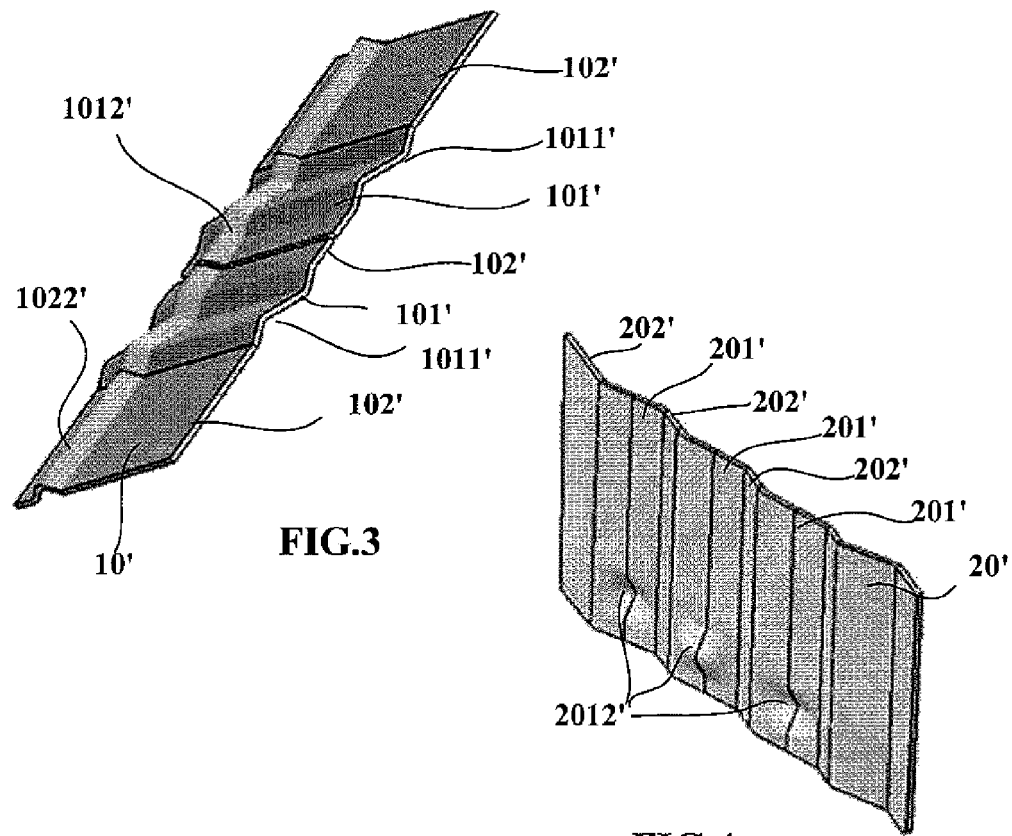
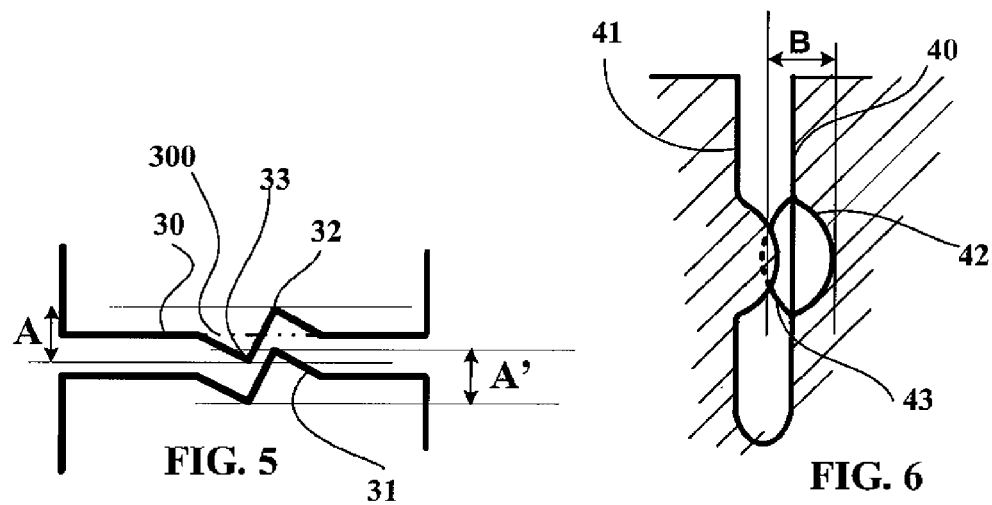

TREAD COMPRISING DUAL ORIENTATION INCISIONS

RELATED APPLICATIONS

This is a U.S. national stage of application No. PCT/EP2007/063135, filed on Dec. 3, 2007.

This patent application claims the priority of French patent application no. 06/10753 filed Dec. 7, 2006, the disclosure content of which is hereby incorporated by reference.

FIELD OF THE INVENTION

The invention relates to tire treads and, in particular, to the tread patterns of such treads; it also relates to a moulding element intended to be fitted to a mould for moulding such treads.

BACKGROUND OF THE INVENTION

As is known, a tire intended to be fitted to a heavy vehicle comprises a carcase reinforcement radially surmounted on the outside by a crown reinforcement itself surmounted by a tread the radially outermost surface of which constitutes the running surface of the tire and is intended to come into contact with the roadway when this tire is being driven on. In order to meet grip and water-clearing requirements when driving on a wet roadway, it is known practice for the tread to be provided with a plurality of essentially longitudinally (or circumferentially) directed grooves and transversely directed grooves (that is to say grooves that make a mean angle other than zero with the longitudinal direction); these grooves delimit raised elements (ribs, blocks) that constitute the tread pattern and that have a radially outermost upper face that forms a part of the running surface of the tread and lateral faces that bound the said grooves.

For certain types of heavy vehicle tire, particularly those intended for use on a roadway covered in standing water or under winter conditions, it is necessary to obtain appropriate tire performance in terms of grip and in terms of traction, while at the same time maintaining a tire life that the user will find satisfactory. To increase the grip of a tire, it is known practice to make a plurality of incisions in a plurality of tread pattern elements. What is meant here by the term incision is a kind of a cut of a width of 1 mm or less, this incision being bounded by opposing walls of rubbery material. The higher the number of incisions, the greater the number of edges formed on the tread and the greater the improvement in grip performance. What is meant by edge is a line of intersection between one of the walls delimiting an incision and the running surface of the tread.

Furthermore, double-wave incisions, that is to say incisions that have undulations in the direction of the line of the incision along the running surface and in the direction of the height of the incision are known, these allowing the rubber tread blocks to maintain a degree of rigidity and giving control over tire wear.

In order to preserve the grip performance of the tread for as long as possible as the tread wears down, it is absolutely essential to provide incisions the depth of which are equal or very similar to the depth of the longitudinal grooves (it being the latter depth that defines the working thickness of the tread in terms of the amount of rubber to be worn away).

A vehicle fitted with tires loads its tires both in the longitudinal direction of the tread (that is to say in a direction tangential to the circumferential direction of the tire) and in the transverse direction (that is to say in a direction parallel to the axis of rotation of the tire). The raised elements are loaded by forces applied by the ground to the running surface in the longitudinal direction when the tire is subjected to traction forces in order to cause the vehicle to advance or braking forces in order to reduce the speed of the said vehicle or stop it completely. These forces load the edges which are directed mainly in a transverse direction (that is to say in a direction that make an angle of less than 45 degrees with the axial direction).

The same raised elements are also loaded by forces applied by the ground to the tire in a transverse direction under cornering. These transverse forces load the edges directed mainly in the longitudinal direction (that is to say that make an angle of at most 45 degrees with the longitudinal direction).

As has already been stated, it is also absolutely essential to "set up" the tread in such a way that tread wear is as even as possible (that is to say that wear affects the entire running surface uniformly without creating patches of more pronounced wear) and for this wear to occur as slowly as possible. Thus, it is possible to give the tread a working life that is satisfactory to the user. Increasing the working life offers the user the advantage of deferring the retreading operation that consists in applying a new tread to the tire after suitable preparation.

SUMMARY OF THE INVENTION

It is an object of the present invention to provide a tread the pattern of which makes it possible to achieve an appreciable improvement in grip performance under longitudinal and transverse loading throughout the working life of the tire while at the same time maintaining working life with respect to wear that the user will find satisfactory.

Definitions

A groove is the space delimited by opposing walls of material distant from one another by a mean width of 1 mm or more; in general, the walls of such a groove do not come into contact with one another under the normal conditions of use of the tire.

An incision is the space delimited by walls of material distant from one another by an average width of less than 1 mm, usually less than 0.7 mm; in general, the walls of such an incision are in contact with one another under at least certain common conditions of use of the tire.

In both instances, a groove or an incision may open into just one other groove or incision or alternatively may open into two grooves or incisions or not have an open end at all.

An incision is said to display a surface undulation (FIG. 5) when there is a local variation in the line of the incision along the running surface about the mean line that connects the end points of the said line of the incision; on either side of the mean line of the incision on the running surface (the geometric line of least squares established on the points of one of the walls delimiting the incision), are drawn mutually parallel lines passing through the points furthest from the mean line and the maximum amplitude A of the undulation or zigzag can thus be measured.

An incision is said to display a zigzag or an undulation in the depth direction (see FIG. 6) when there is a local variation in the line of the incision in the heightwise direction (that is to say in the depth of the tread). The total amplitude of the undulation measures the maximum distance measured on one wall of material between points of the said wall in a direction perpendicular to a mean surface representative of the incision.

The object is achieved with a tread that has a surface, known as the running surface, this tread being intended to come into contact with the roadway when driven on.

This tread is provided with raised elements delimiting grooves, some of these elements being in the form of blocks. Each block is delimited by several lateral faces. At least one plurality of blocks comprise at least one first incision and at least one second incision, that is to say a cut of a mean width of less than 1 mm. The at least one first incision is delimited by walls of rubbery material, each of the said walls comprising at least two non-planar parts, each non-planar part being separated from the other non-planar parts by an intermediate part, the said non-planar parts having geometric shapes exhibiting at least one undulation or zigzag at the surface of the tread of total amplitude A and at least one undulation or zigzag in the depth of the tread with total amplitude B, the intermediate part between two non-planar parts of a first incision having a geometry exhibiting at least one undulation or zigzag in the depth of the tread of total amplitude B' and no undulation on the surface of the tread.

The at least one second incision is delimited by walls of rubbery material, each of the said walls comprising at least two non-planar parts NPP. Each of these non-planar parts is separated from the other non-planar parts by an intermediate part and has a geometric shape exhibiting at least one deformation in relief in a direction perpendicular to the mean surface of the said part, this deformation in relief having a maximum amplitude C. Each intermediate part of the at least one second incision situated between two non-planar parts of the said second incision has no deformation in relief.

In addition, the at least one first incision intersects at least one second incision to form at least one intersection and divide the raised element in which they are made into several volume elements, each intersection being created between an intermediate part of the at least one first incision and an intermediate part of the at least one second incision.

Finally, the mean planes of the first incisions of a block are essentially parallel to some of the lateral faces of the said block and the mean planes of the second incisions are substantially parallel to the other lateral faces of the same block so as to divide the raised element into several material elements of substantially the same volume.

This tread is characterized in that the points of maximum amplitude of the at least one undulation in the depth of the first incisions are situated at between 25% and 50% of the depth of the incision measured from the running surface of the tread.

BRIEF DESCRIPTION OF THE DRAWINGS

Other features and advantages of the invention will become apparent from the description given hereinafter with reference to the attached drawings which, by way of nonlimiting examples, show some embodiments of the subject matter of the invention.

FIG. 3 shows a view of a first blade moulding a first incision in the blocks of the tread depicted in FIG. 1;

FIG. 4 shows a view of a second blade moulding a second incision in the blocks of the tread depicted in FIG. 1;

FIG. 5 shows the line on a surface of the tread of an incision that displays a local variation in surface geometry;

FIG. 6 shows the line within the depth of a tread of an incision that displays a local variation in geometry in the depthwise direction.

DETAILED DESCRIPTION OF THE DRAWINGS

Figure 1:
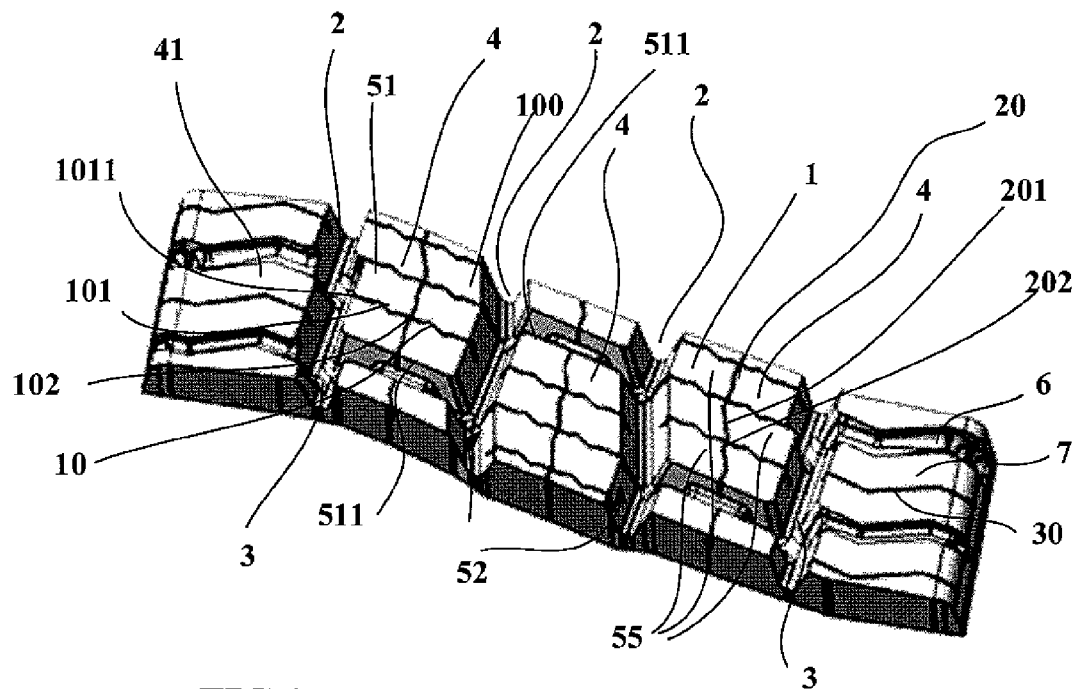
FIG. 1 shows part of a tread according to the invention.

FIG. 1 shows a partial view of a running surface 100 of a tread 1, in the as-new condition, for a tire of size 315/80 R 22.5. This tread 1 according to the invention comprises a plurality of longitudinally and transversally orientated grooves 2, 3 which delimit a plurality of blocks 5 of which the radially outermost surfaces 51 form the running surface of the tread. This tread 1 comprises four longitudinal grooves 2 (corresponding to the circumferential direction on the tire, indicated by the axis XX') of a depth equal to 14 mm (depths are measured on a new tread, that is to say a tread that has not yet been driven on). The tread comprises an axially outer row on each side to form side edge regions of the said tread. These side edge regions are provided with transverse grooves 6 delimiting a plurality of blocks 7. Each of the blocks 7 of the side edge regions is provided with an incision 30 displaying a surface zigzag; in order to maintain appropriate rigidity, these side edge region blocks 7 are connected together over just part of their height by bridges of material.

Between the side edge regions of the tread 1 there are three intermediate rows of blocks 5, each of these blocks being bounded by six lateral faces 52 and a contact face 51 of polygonal shape situated radially on the outside. The largest dimension of the contact face 51 of these blocks 5 of the intermediate rows is directed longitudinally along XX'. The edges 511 for coming into and out of contact are inclined with respect to the axial direction.

On the radially outermost surface 51 of each block of the three rows situated between the side edge regions it is possible to discern the lines of first incisions 10 with a depth of 8 mm and the line of a second incision 20 which is 7.5 mm deep, the first incisions 10, of which there are three, being directed transversally and substantially parallel to the edges of the block. The second incision 20 displays, on the contact face 51, a line that intersects the lines of the first three incisions 10 substantially at their middle, this second incision 20 being substantially parallel to the longitudinal direction (or to the circumferential direction on the tire provided with the tread described).

It is also possible to discern on the lateral faces 52 of the blocks 5 the zigzagging lines, in the depthwise direction of the tread, of the first incisions 10. These first incisions 10 therefore display a dual wave of zigzag undulations, in both the depthwise direction and on the running surface. It can also be seen that the line of the second incision forms a zigzag on the running surface and intersects the lines of the first incisions.

The first incisions 10 are delimited by walls of rubbery material, each of the said walls comprising at least two non-planar parts 101, each non-planar part being separated from the other non-planar parts by an intermediate part 102, the said non-planar parts 101 having geometric shapes displaying two undulations 1011 at the surface of the tread of total amplitude A and one undulation 1012 in the depth of the tread of total amplitude B. The intermediate part 102 between two non-planar parts 101 of a first incision 10 has a geometry comprising an undulation 1022 in the depth of the tread of total amplitude B' and has no undulation on the surface 100 of the tread.

The second incision 20 is delimited by walls of rubber material, each of the said walls comprising three non-planar parts 201, each non-planar part being separated from the other non-planar parts by an intermediate part 202, the said non-planar parts 202 having geometric shapes displaying an undulation 2012 (not visible in FIG. 1) in the depth of the tread of maximum amplitude C. Further, each intermediate part 202 of the second incision 20 situated between two non-planar parts 201 of the said second incision has no deformation or undulation.

Each first incision 10 intersects the second incision 20 to form one intersection and thus divide the raised element 5 into several volume elements 55, each intersection being created between an intermediate part 102 of the first incision 10 and an intermediate part 202 of the second incision 20.

Figure 2:
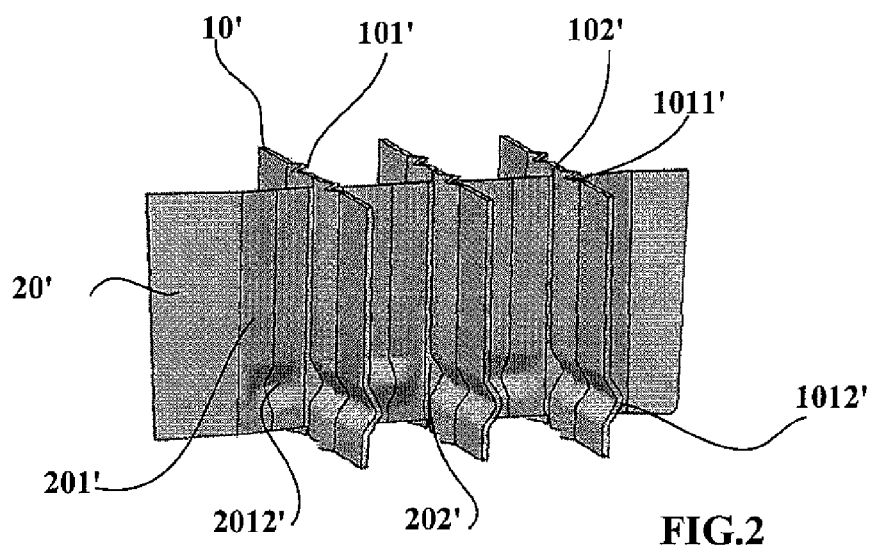
FIG. 2 shows a blade intended to mould the incisions in the blocks of the tread depicted in FIG. 1.

To make the invention easier to understand, FIGS. 2, 3, 4 depict the metal blades used in the mould to mould the tread shown in FIG. 1. Furthermore, the numerical references are used both to denote the said blade parts and the corresponding parts moulded in the tread. For example, the incision 10 is moulded using the blade 10'.

The metal blades form, in one and the same block 5, while the tread 1 is being moulded, walls delimiting first incisions 10 and walls delimiting a second incision 20.

To mould each block in FIG. 1, use is made of a combination of four blades 10', 20' like those depicted in FIG. 2, these blades having mean thicknesses of 0.6 mm.

Three first blades 10' of planar overall shape locally display deformations about this planar shape to mould the three first incisions 10 visible in FIG. 1. As can be seen in FIG. 3, each of these three first blades 10' has main walls comprising at least two non-planar parts 101' to mould non-planar incision parts 101, each non-planar part 101' being separated from the other non-planar parts by an intermediate part 102'.

These non-planar parts 101' have geometric shapes displaying four zigzags 1011' visible via their line on the surface of the tread (whether this tread surface is new or part-worn). The total amplitude A of these zigzags on one face of material here is equal to 2 mm (this amplitude measures the distance between two parallel planes passing through those points of the said face that are furthest apart in a direction perpendicular to the mean surface of the face). Further, these same non-planar parts 101' of the first blades 10' comprise, in combination with the surface zigzags 1011', a depthwise zigzag 1012' (approximately halfway down the depth of the incision). This zigzag 1012' in the depthwise direction has a total amplitude B, measured on one face of material, equal to 1.3 mm in the example described.

The intermediate part 102' between two non-planar parts 101' of a first blade 10' has a geometry displaying at least one undulation 1021' in the depth of the tread with total amplitude B equal to 1.3 mm This intermediate part 102' does not, on the other hand, have any zigzag or undulation in any plane of section perpendicular to the height of the blade (a plane of section perpendicular to the height of the blade corresponds substantially to a plane tangential to the running surface of the tread).

The second blade 20', of planar overall shape, visible in FIG. 4, comprises three non-planar parts 201', each non-planar part being separated from the other non-planar parts by an intermediate part 202'. Each non-planar part 201' of the second blade 20' has a geometric shape locally displaying at least one deformation in relief 2012' in a direction perpendicular to the mean surface of the said part.

The deformations in relief 2012' are formed alternately as recesses and reliefs on the three non-planar parts 201' of the second blade; the maximum amplitude C, measuring the maximum distance at two of the remotest points of the said deformations on one and the same wall of rubbery material, is equal in this instance to 4 mm. Each intermediate part 202' of the second blade 20' situated between two non-planar parts 201' of the said second blade has no deformation in relief whatsoever.

To mould a block 5 of the intermediate rows according to FIG. 1, the three first blades of 10' are assembled with the second blade 20' in such a way that each intermediate part 202' of the second blade 20' is carried by an intermediate part 102' of a first blade 10' that has no surface zigzag.

From a practical standpoint, the manufacture of the blade for moulding the incisions as shown in FIG. 1 is performed by assembling the three first blades 10' and the second blade 20'. This assembly is done in pieces: the second blade 20' is cut at the middle of each intermediate part 202' and the pieces thus obtained are welded to a first blade 10' on each side of this first blade. The angle between the first blades and the second blade is substantially equal to 90 degrees in order to avoid moulding into the block a part made of rubbery material that has a narrow point and is mechanically weak.

This combination of first and second blades makes it possible to obtain, during the moulding process, a division of a block 5 into several parts 55 of almost the same volume and which, depending on the direction of loading, will either be or not be mechanically connected to one another. What mechanically connected means is that the opposing walls of one and the same incision interact to provide an appropriate level of rigidity.

The invention makes it possible, while at the same time creating a high number of edges of material, which are good for traction, braking and road handling performance, to limit as far as possible any relative movement between opposing walls so as to limit uneven wear (that is to say localized wear that is more pronounced by comparison with the remainder of the treat pattern elements).

Advantageously, the mean planes of the first incisions 10 are substantially parallel to certain lateral faces of a raised element of the tread and the mean planes of the second incisions 20 are substantially parallel to the other lateral faces of the same element, so as to divide this raised element into several parts of substantially the same volume.

As a preference, the points of maximum amplitude of the at least one undulation in the depthwise direction of the first incisions is situated at between 25 and 50% (in this instance 35%) of the height of the incision measured from the running surface of the tread (the height of the incision corresponds to the depth in the tread).

As a preference, the at least one deformation in relief of the second incisions is situated at between 25% and 50% (45% in this instance) of the height of the incision measured from the running surface of the tread.

The blocks 5 of the intermediate rows are also joined together by a bridge of rubbery material of a height substantially equal to half the depth of the groove (these bridges extend from the base of the grooves).

FIG. 5 depicts the line of an incision on the running surface of a tread, this line comprising several zigzags. On this surface it is possible to discern two lines 30, 31 forming opposing edges. These lines 30, 31 follow identical paths. Each line follows a zigzagging path with a trough 32 and a crest 33 in the example depicted. The maximum amplitude A is measured on the path of the line 30 between the points with the furthest mutual separation in a direction perpendicular to the mean line of said path. This mean line 300 (in dotted line in FIG. 5) is obtained as a geometric line of least squares established on the points of the line of the edge 30. The line 31 facing the line 30 has the same maximum amplitude of undulation in this instance; however, it could have a different amplitude A'.

FIG. 6 depicts an incision in a plane of section perpendicular to the running surface. In this plane of section of the incision—showing the depth of the incision—it is possible to discern two opposing lines 40, 41. In this instance, the incision, a section through which is shown, comprises, on each of the faces of material delimiting it, reliefs in the form of recesses 42 and crests 43. On one face, the maximum amplitude B of the undulation is measured between the most distant points in a direction perpendicular to a mean plane to the said face.

The invention is not restricted to the examples described and depicted and various modifications can be made thereto without departing from its scope.

The invention claimed is:

1. A tread having a running surface arranged to come into contact with a roadway during running, this tread being provided with raised elements, a plurality of these raised elements being provided with at least one first incision and at least one second incision, the at least one first incision being delimited by walls of rubbery material, each of said walls comprising at least two non-planar parts, each non-planar part being separated from the other non-planar parts by an intermediate part, said non-planar parts having geometric shapes exhibiting at least one undulation at the surface of the tread of total amplitude A and at least one undulation in the depth of the tread with total amplitude B, the intermediate part between two non-planar parts of a first incision having a geometry exhibiting at least one undulation in the depth of the tread of total amplitude B' and no undulation on the surface of the tread, the at least one second incision being delimited by walls of rubbery material, each of said walls comprising at least two non-planar parts, each non-planar part being separated from the other non-planar parts by an intermediate part, said non-planar parts having geometric shapes exhibiting at least one undulation in the depth of the tread of maximum amplitude C, each intermediate part of the at least one second incision situated between two non-planar parts of said second incision having no deformation in relief, the at least one first incision intersecting at least one second incision to form at least one intersection and thus divide the raised element in which they are made into several volume elements, each intersection being created between an intermediate part of the at least one first incision and an intermediate part of the at least one second incision, the raised element provided with incisions being a block delimited by several lateral faces, the mean planes of the first incisions being substantially parallel to some of the lateral faces and the mean planes of the second incisions being substantially parallel to the other lateral faces so as to divide the raised element into several material elements of substantially the same volume, wherein the points of maximum amplitude of the at least one undulation in the depth of the first incisions are situated at between 25% and 50% of the depth of the incision measured from the running surface of the tread, and wherein there is no undulation in the depth of the first incisions outside of between 25% and 50% of the depth of the incision measured from the running surface of the tread.

2. The tread according to claim 1, wherein the at least one deformation in relief of the second incisions is situated at between 25% and 50% of the depth of the incision measured from the running surface of the tread.

3. The tread according to claim 1, wherein each second incision is provided with at least two deformations in relief, said deformations in relief alternately forming recesses and crests on said second incision.

4. The tread according to claim 1 wherein the total amplitude B of the undulation in the depth of the non-planar parts of the first incisions is equal to the amplitude B' of the undulation in the depth of the intermediate parts of said first incisions.

5. The tread according to claim 2, wherein each second incision is provided with at least two deformations in relief, said deformations in relief alternately forming recesses and crests on said second incision.

6. The tread according to claim 5, wherein the total amplitude B of the undulation in the depth of the non-planar parts of the first incisions is equal to the amplitude B' of the undulation in the depth of the intermediate parts of said first incisions.

7. The tread according to claim 2, wherein there is no deformation in relief of the second incisions outside of between 25% and 50% of the depth of the incision measured from the running surface of the tread.

* * * * *